(12) United States Patent
He et al.

(10) Patent No.: US 9,813,852 B2
(45) Date of Patent: Nov. 7, 2017

(54) SYSTEM AND METHOD FOR POSITIONING TERMINAL

(71) Applicant: Tencent Technology (Shenzhen) Company Limited, Guangdong (CN)

(72) Inventors: Peng He, Guangdong (CN); Yuhuang Li, Guangdong (CN); Yong Hu, Guangdong (CN); Chuan Chen, Guangdong (CN); Jing Nie, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 38 days.

(21) Appl. No.: 14/585,254

(22) Filed: Dec. 30, 2014

(65) Prior Publication Data

US 2015/0119084 A1    Apr. 30, 2015

Related U.S. Application Data

(63) Continuation of application No. PCT/CN2014/073938, filed on Mar. 24, 2014.

(30) Foreign Application Priority Data

Apr. 3, 2013  (CN) .......................... 2013 1 0115968

(51) Int. Cl.
  *H04W 24/00* (2009.01)
  *H04W 4/02* (2009.01)
  *H04W 4/20* (2009.01)

(52) U.S. Cl.
  CPC ............. *H04W 4/02* (2013.01); *H04W 4/028* (2013.01); *H04W 4/206* (2013.01)

(58) Field of Classification Search
  CPC ........ H04W 4/02; H04W 4/028; H04W 4/206
  (Continued)

(56) References Cited

U.S. PATENT DOCUMENTS 7,636,339 B2 * 12/2009 Shaffer ................... H04W 4/08
                                                370/338
7,639,943 B1 * 12/2009 Kalajan .................. G03B 29/00
                                                396/429

(Continued)

FOREIGN PATENT DOCUMENTS

CN         101557552 A    10/2009
CN         102348258 A     2/2012
(Continued)

OTHER PUBLICATIONS

Office Action issued in corresponding Chinese Application No. 201310115968.4 dated Dec. 9, 2014 with a Concise English Explanation.

(Continued)

*Primary Examiner* — Babar Sarwar
(74) *Attorney, Agent, or Firm* — Anova Law Group, PLLC

(57) ABSTRACT

A method for positioning terminals includes obtaining location information of positioned terminals; obtaining relevance information of the positioned terminals; obtaining location information of relevance terminals associated with the positioned terminals according to the location information and the relevance information of the positioned terminals. The invention is applied to improve coverage of a LBS service based on users' location information.

16 Claims, 5 Drawing Sheets

(58) Field of Classification Search
USPC .......... 455/404.2, 412.1–414.2, 418–422.1, 455/456.1–457, 552.1, 550.1
See application file for complete search history.

(56) References Cited

U.S. PATENT DOCUMENTS

| | | | | |
|---|---|---|---|---|
| 8,000,724 | B1* | 8/2011 | Rayburn | G01S 5/0027 370/310 |
| 2004/0243941 | A1* | 12/2004 | Fish | G06Q 10/107 715/752 |
| 2007/0011704 | A1* | 1/2007 | Anglin | H04N 7/17318 725/46 |
| 2008/0070593 | A1* | 3/2008 | Altman | H04L 63/102 455/457 |
| 2009/0233623 | A1* | 9/2009 | Johnson | H04W 4/02 455/456.3 |
| 2009/0248507 | A1* | 10/2009 | Hamaoui | G06Q 30/02 705/14.58 |
| 2011/0238517 | A1* | 9/2011 | Ramalingam | G06Q 20/10 705/26.1 |
| 2012/0302256 | A1* | 11/2012 | Pai | H04W 4/02 455/456.2 |
| 2013/0109363 | A1* | 5/2013 | Yang | H04M 1/2745 455/414.1 |
| 2013/0317944 | A1* | 11/2013 | Huang | G01S 5/0252 705/26.61 |
| 2014/0148192 | A1* | 5/2014 | Hodges | H04W 4/025 455/456.1 |

FOREIGN PATENT DOCUMENTS

| | | |
|---|---|---|
| CN | 102769821 A | 11/2012 |
| CN | 102811481 A | 12/2012 |
| CN | 103220623 A | 7/2013 |

OTHER PUBLICATIONS

International Search Report issued in corresponding International Application No. PCT/CN2014/073938 dated Jul. 9, 2014.

* cited by examiner

SYSTEM AND METHOD FOR POSITIONING TERMINAL

CROSS REFERENCE TO RELATED APPLICATIONS

This application is a U.S. continuation application under 35 U.S.C. §111(a) claiming priority under 35 U.S.C. §§120 and 365(c) to International Application No. PCT/CN2014/073938 filed Mar. 24, 2014, which claims the priority benefit of Chinese Patent Application No. 201310115968.4 filed Apr. 3, 2013, the contents of which are incorporated by reference herein in their entirety for all intended purposes.

FIELD

The disclosure relates to location service fields, and particularly to a system and method for positioning terminal.

BACKGROUND

The section provides background information related to the present disclosure which is not necessarily prior art.

Location based services (LBS) provide all kinds of information services related to locations to help users to obtain information, products and social relationships based on regions. The LBS may position users' locations. In the related art, the users' locations are positioned through existing positioning technologies such as positioning satellites, mobile base stations or wireless fidelity (WIFI) hotspot equipments. The existing position technologies have the following defects:

(1) A positioning way based on the positioning satellite needs corresponding satellite positioning modules (such as global positioning system, (GPS)), and locations of network equipments near to users are positioned through only users' mobile terminals. Therefore, the existing positioning technologies cannot be used by users who have no mobile terminals and the users who have no the corresponding satellite positioning module, such as personal computer terminal users.

(2) Because of network environment of users' terminals or settings of the users' terminals, frequencies of the users' terminals transmitting equipment information may be lower. When the equipment information fails to be transmitted by the users' terminals, the users' terminals can be positioned. Therefore, a period of time corresponding to the positioned locations may be less.

SUMMARY

The disclosed a method and device for positioning terminals are directed to solve one or more problems set forth above and other problems.

This section provides a general summary of the disclosure, and is not a comprehensive disclosure of its full scope or all of its features.

Further regions of applicability will become apparent from the description provided herein. The description and specific examples in this summary are intended for purposes of illustration only and are not intended to limit the scope of the present disclosure.

A method for positioning terminals, comprising:
obtaining location information of positioned terminals;
obtaining relevance information of the positioned terminals;
obtaining location information of relevance terminals associated with the positioned terminals according to the location information and the relevance information of the positioned terminals.

A device for positioning terminals, comprising:
a location information obtaining module configured to obtain obtaining location information of positioned terminals;
a relevance information obtaining module configured to obtaining relevance information of the positioned terminals;
a relevance positioning module configured to obtain location information of relevance terminals associated with the positioned terminals according to the location information and the relevance information of the positioned terminals.

BRIEF DESCRIPTION OF THE DRAWINGS

In order to illustrate the embodiments or existing technical solutions more clearly, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

Technical solutions in embodiments of the present invention will be illustrated clearly and entirely with the aid of the drawings in the embodiments of the invention. It is apparent that the illustrated embodiments are only some embodiments of the invention instead of all of them. Other embodiments that a person having ordinary skills in the art obtains based on the illustrated embodiments of the invention without paying any creative work should all be within the protection scope sought by the present invention.

Figure 8:
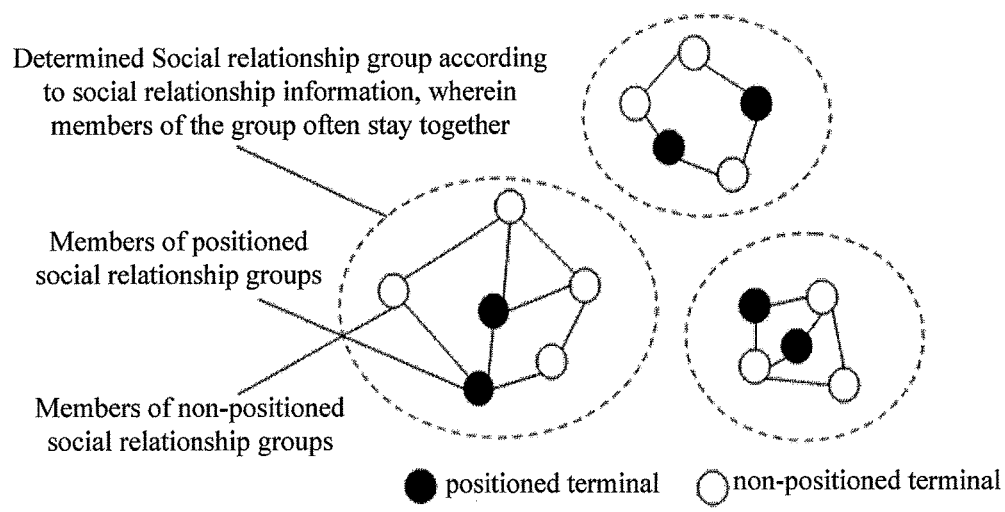
FIG. 8 is a schematic diagram of social relationship groups.
Figure 9:
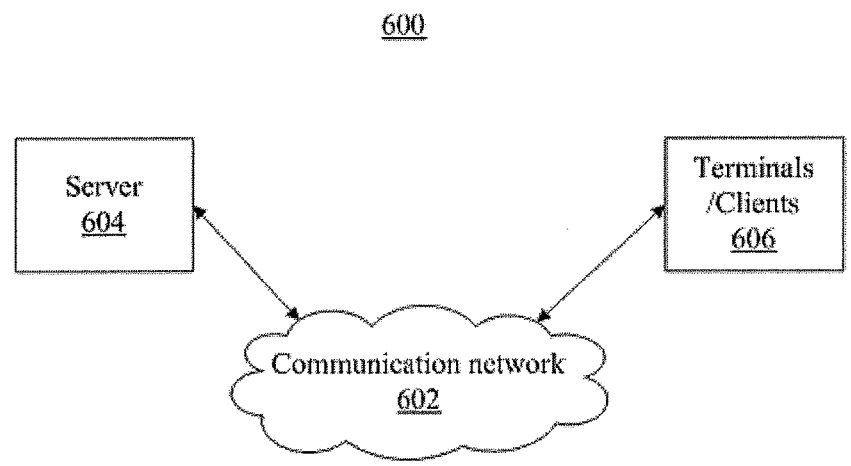
FIG. 9 depicts an exemplary environment incorporating certain disclosed embodiments.
Figure 10:
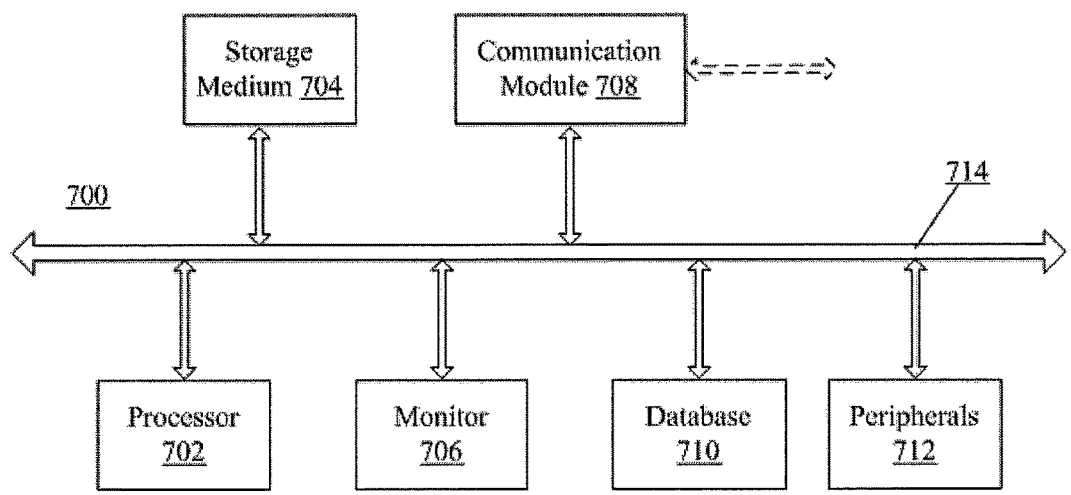
FIG. 10 depicts an exemplary computing system consistent with the disclosed embodiments.

FIG. 9 depicts an exemplary environment 600 incorporating exemplary methods and systems for position terminals in accordance with various disclosed embodiments. As shown in FIG. 8, the environment 600 can include a server 604, a terminal 606, and a communication network 602. The server 604 and the terminal 606 may be coupled through the communication network 602 for information exchange including, e.g., sending/receive location information of a terminal, obtaining relevance information of the terminal, sending location information of relevance terminals, etc. Although only one terminal 606 and one server 604 are shown in the environment 600, any number of terminals 606 or servers 604 may be included, and other devices may also be included.

The communication network 602 may include any appropriate type of communication network for providing network connections to the server 604 and terminal 606 or among multiple servers 604 or terminals 606. For example, the communication network 602 may include the Internet or other types of computer networks or telecommunication networks, either wired or wireless.

A terminal, as used herein, may refer to any appropriate user terminal with certain computing capabilities, e.g., a personal computer (PC), a work station computer, a hand-held computing device (e.g., a tablet), a mobile terminal (e.g., a mobile phone or a smart phone), or any other client-side computing device.

A server, as used herein, may refer to one or more server computers configured to provide certain server functionalities, e.g., receiving location information of a terminal, relevance information obtaining, relevance information processing, sending location information of relevance terminals, etc. A server may also include one or more processors to execute computer programs in parallel.

The server 604 and the terminal 606 may be implemented on any appropriate computing platform. FIG. 9 shows a block diagram of an exemplary computing system 700 (or computer system 700) capable of implementing the server 604 and/or the terminal 606. As shown in FIG. 9, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, e.g., Read-Only Memory (ROM), Random Access Memory (RAM), and flash memory modules, and mass storages, e.g., CD-ROM, U-disk, removable hard disk, etc. The storage medium 704 may store computer programs for implementing various processes (e.g., receiving location information, obtaining relevance information, processing relevance information, etc.), when executed by the processor 702.

The monitor 706 may include display devices for displaying contents in the computing system 700, e.g., displaying location information of relevance terminals or location information interface. The peripherals 712 may include I/O devices such as keyboard and mouse.

Further, the communication module 708 may include network devices for establishing connections through the communication network 602. The database 710 may include one or more databases for storing certain data and for performing certain operations on the stored data, e.g., storing location information a terminals, terminal IDs, relevance information of the terminals, and location information of relevance terminals, or any other suitable data searching and management operations.

In operation, the terminal 606 may cause the server 604 to perform certain actions, e.g., receiving location information of a terminal, obtaining relevance information of the terminals, and returning location information of relevance terminals, etc. The server 604 may be configured to provide structures and functions for such actions and operations. More particularly, the server 604 may include a management server, a messaging server, a positioning server, or any other suitable servers for corresponding functions.

In various embodiments, a terminal involved in the disclosed methods and systems can include the terminal 606, while a server involved in the disclosed methods and systems can include the server 604. The methods and systems disclosed in accordance with various embodiments can be executed by a computer system. In one embodiment, the disclosed methods and systems can be implemented by a server.

Various embodiments provide methods and systems for processing report information. The methods and systems are illustrated in various examples described herein.

Figure 1:
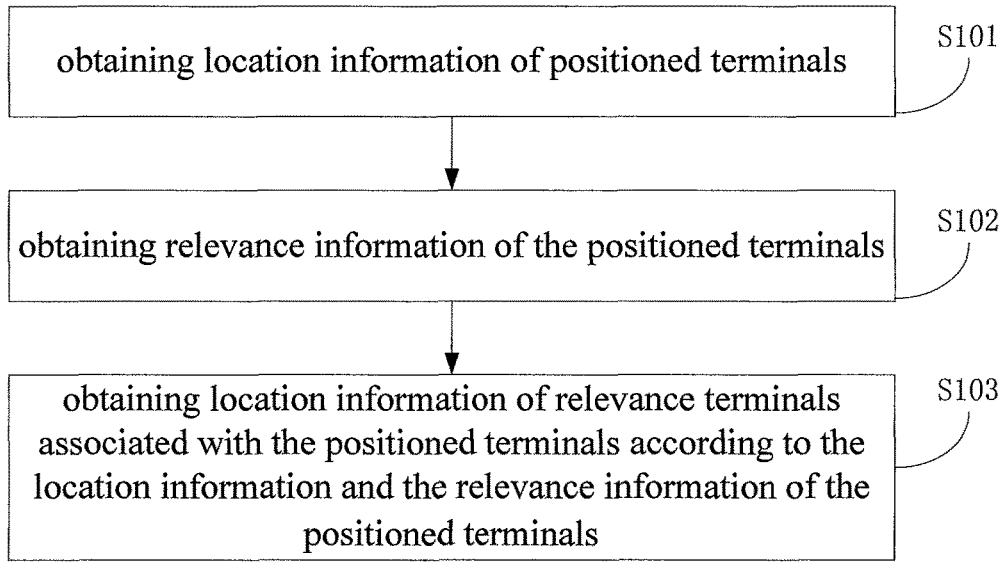
FIG. 1 is a flowchart of an example of a method for positioning terminals according to various embodiments.

Referring to FIG. 1, it is a flowchart of an example of a method for positioning terminals according to various embodiments. The method may be applied to equipments supplying all kinds of LBS services or backend servers. The method includes the following steps.

Step S101: obtaining location information of positioned terminals.

Specifically, the positioned terminals may be the terminals positioned through existing positioning ways based on satellites, mobile base stations or wireless fidelity (WiFi) hotspot devices. When the positioned terminals are positioned through existing positioning ways based on satellites, mobile base stations or wireless fidelity (WiFi) hotspot devices, the location information of the positioned terminals can be obtained. The positioned terminals also can be the terminals corresponding to the location information obtained by using the method of the embodiment. The location information may be longitude and latitude, coordinates on the maps, graphic, word, or other means, to indicate geographic location information of the positioned terminals. Preferably, when the location information of the positioned terminal is obtained, positioning time of obtaining the position information this time may be recorded.

Step 102: obtaining relevance information of the positioned terminals.

In practice, the relevance information may be the relevance information between the positioned terminals and relevance terminals. The relevance terminals are the terminals having region relevance relationships with the positioned terminals. The relevance terminals may include relevance account login terminals, first non-positioned terminals, and second non-positioned terminals. Login accounts of the relevance account login terminals are associated with login accounts of the positioned terminals. The first non-positioned terminals and the positioned terminals have the same network equipment information. Social relationships between the second non-positioned terminals and the positioned terminals satisfy a predetermined condition.

The login accounts of the relevance account login terminals and the long account of the positioned terminals may be the same. Or the login accounts of the relevance account login terminals may be associated with the login accounts of the positioned terminals in advance, and the login accounts of the relevance account login terminals and the positioned terminals are used by the same users on the different service platform, or have the relevance relationship established by associated users in the same server. For example, the users can use the same login account to login in an instant messaging tool in a mobile phone and a personal computer. The mobile phone is the relevance account login terminal of the personal computer. Another example, the mobile phone is the positioned terminal. The login account of the mobile phone is the login account of the instant messaging tool running on the mobile phone. The login account of the mobile phone has been associated with a login account of social networking services (SNS) community running on the user's computer. Therefore, the user's computer is the relevance account login terminal of the mobile phone. The relevance information may include login information of the relevance account login terminal. The login information includes login time of logining in the relevance account login terminal this time. The login information also may include an identifier of the relevance account login terminal, such as network card MAC.

The non-positioned terminals with the same network equipment information as the positioned terminals and the positioned terminals may be in the same local area network (LAN). The relevance information may include the network equipment information of the positioned terminals. The network equipment information may be a unique identifier of the network management equipment used by the LAN or the public IP address. The terminals with the same network equipment information as the positioned terminals can be considered as the terminals belonging to the same LAN.

The non-positioned terminals may be the terminals used by users have a special social relationship with the user corresponding to the positioned terminal. The social relationships between the users corresponding to the positioned terminals and the users corresponding to the non-positioned terminals satisfy the predetermined condition. The users having a special social relationship with the users corresponding to the positioned terminals may be the user's family, colleagues, friends, and so on. The relevance information includes the social relationship information of the users corresponding to the positioned terminals. In detail, the relevance information may include personal relationship information, social interaction information, similarity of personal information, and so on. That whether the social relationship between the users corresponding to the positioned terminals and users corresponding to other terminals satisfy the predetermined condition can be determined through the relevance information of the positioned terminals.

Step 103: obtaining location information of relevance terminals associated with the positioned terminals according to the location information and the relevance information of the positioned terminals. The relevance terminals may be the terminals with the same region relevance with the positioned terminals. When the relevance terminals are not mobile terminals and have no the corresponding satellite positioning modules, the current location information of the relevance terminals cannot be obtained. Or because of the network environment of the relevance terminals or settings of the relevance terminals, the current location information of the relevance terminals cannot be obtained.

In practice, for the relevance account login terminals, the login accounts of the relevance account login terminals are associated with the login accounts of the positioned terminals (such as the same accounts or the same user's multiply accounts). Therefore, when the time of logining in the relevance account login terminals and the time of positioning the positioned terminals are closer or coincident, the obtained location information of the positioned terminals at the time of positioning the positioned terminals is defined as the location information of the relevance account login terminals.

For the non-positioned terminals with the same network equipment information as the positioned terminals, the non-positioned terminals and the positioned terminals are in the same LAN. Generally, the locations of the terminals in the same LAN are concentrated. Therefore, the location information of the non-positioned terminals with the same network equipment information as the positioned terminal can be determined according to the location information of the positioned terminals.

For the non-positioned terminals, owing to the social relationship between the non-positioned terminals and the positioned terminals satisfy the predetermined condition, it indicates that the users corresponding to the non-positioned terminals and the users corresponding to the positioned terminals are closer and often stay together. Therefore, the location information of the non-positioned terminals can be obtained according to the location information of the positioned terminals.

Three examples are taken to illustrate a process of obtaining the location information of the relevance terminals below.

Figure 2:
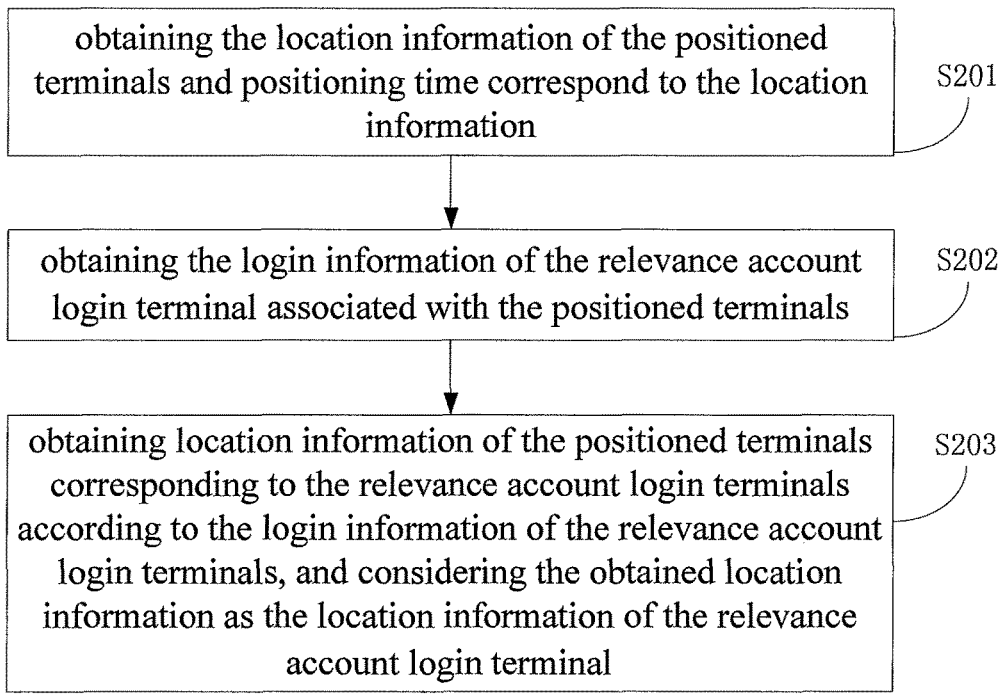
FIG. 2 is a flowchart of another example of a method for positioning terminals according to various embodiments.

FIG. 2, it is it is a flowchart of another example of a method for positioning terminals according to various embodiments. The method includes the following steps.

Step 201: obtaining the location information of the positioned terminals and positioning time correspond to the location information. The positioned terminals may be the terminals positioned through existing positioning ways based on satellites, mobile base stations or wireless fidelity (WiFi) hotspot devices. When the positioned terminals are positioned through existing positioning ways based on satellites, mobile base stations or wireless fidelity (WiFi) hotspot devices, the location information of the positioned terminals can be obtained. The positioned terminals also can be the terminals corresponding to the location information obtained by using the method of the embodiment. In the embodiment, the location information of the positioned terminals and the positioning time corresponding to the location information this time may be recorded to be used to be as references of the following obtained behavior information of the positioned terminals.

Step 202: obtaining the login information of the relevance account login terminal associated with the positioned terminals. The login information includes login time, and further includes an identifier of the relevance account login terminal, to distinguish multiply relevance account login terminals, such as network card MAC, etc. The login accounts of the relevance account login terminals and the login account of the positioned terminals may be the same. Or the login accounts of the relevance account login terminals may be associated with the login accounts of the positioned terminals in advance, and the login accounts of the relevance account login terminals and the positioned terminals are used by the same users on the different service platform, or the login accounts of the relevance account login terminals and the positioned terminals have a relationship been established by associated users in the same server.

Step 203: obtaining location information of the positioned terminals corresponding to the relevance account login terminals according to the login information of the relevance account login terminals, and considering the obtained location information as the location information of the relevance account login terminal. Specifically, for example, when a time difference between the login time of the relevance account login terminal and the latest positioning time of the positioned terminal is less than a predetermined threshold (such as three seconds), the location information obtained at the positioning time of the positioned terminal is considered as the location information of the relevance account login terminal.

Further, the behavior information of the positioned terminals can be obtained according to the location information obtained in a period of time of the positioned terminals and the corresponding positioning time. The behavior information includes the constant location information of the positioned terminal and the period of time corresponding to the constant location information. A period of time corresponding to the login time of the relevance account login terminals in the behavior information can be determined. The constant location information corresponding to the determined period of time can be obtained to be used to be as the location information of the relevance account login terminal.

Specifically, the period of time may be a latest week, or a latest month, or form starting positioning services to data. The period of time also may be the time specified by the users. The behavior information of the positioned terminals can be obtained through the location information of the positioned terminals and the corresponding positioning time in the determined period of time. The behavior information indicates the behavioral regularly of the positioned terminals. The location information of the relevance account login terminal can be obtained through the login time of the relevance account login terminal and the behavioral regularly of the positioned terminal. For example, generally, the positioned terminal is in xx building from nine o'clock to eighteen o'clock of workdays, and in xx residential area from twenty one o'clock in the night to eight o'clock of the second day. If the login time obtained at a certain time (or several times) of the relevance account login terminal is twenty two o'clock on Wednesday, the period of time which the login time of the relevance account login terminal belongs to is from twenty one o'clock in the night to eight o'clock of the second day. The constant location of the positioned terminals is the xx residential area in the period of time from twenty one o'clock in the night to eight o'clock of the second day. Therefore, the constant location information of the positioned terminals is used to be as the location information of the relevance account login terminals. When the login time obtained at a certain time (or several times) of another relevance account login terminal corresponding to the positioned terminals is ten o'clock on Monday, the period of time which the login time of another account login terminal corresponding to the positioned terminals belongs to is from nine o'clock to eighteen o'clock of the workdays. The constant location of the positioned terminals in the period of time from nine o'clock to eighteen o'clock of the workdays is the xx building. Therefore, the constant location information of the positioned terminals is used to be the location information of another relevance account login terminal. The different relevance account login terminals corresponding to the same positioned terminal can be distinguished through the identifiers of the obtained login information. As mentioned, the relevance account login terminals in the period of work time may be personal computers of an office. The relevance account login terminals in the period of rest time may be notebook computers of the user's home. The personal computers of the office and the notebook computers of the user's home have the corresponding identifier, such network MAC.

Figure 3:
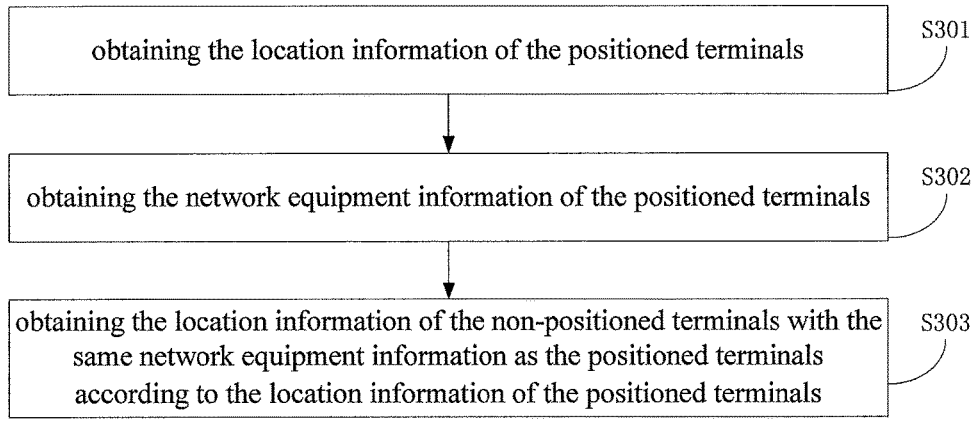
FIG. 3 is a flowchart of a yet another example of a method for positioning terminals according to various embodiments.

Referring to FIG. 3, it is a flowchart of a yet another example of a method for positioning terminals according to various embodiments. The method includes the following steps.

Step 301: obtaining the location information of the positioned terminals. The positioned terminals may be the terminals positioned through existing positioning ways based on satellites, mobile base stations or wireless fidelity (WiFi) hotspot devices. When the positioned terminals are positioned through existing positioning ways based on satellites, mobile base stations or wireless fidelity (WiFi) hotspot devices, the location information of the positioned terminals can be obtained. The positioned terminals also can be the terminals corresponding to the location information obtained by using the method of the embodiment.

Step 302: obtaining the network equipment information of the positioned terminals. The network equipment information may be the unique identifier of the internet gateway device used by the LAN, or the public IP address. Preferably, after obtaining the network equipment information of the positioned terminals, the step 301 may be implemented to obtain the location information of the all positioned terminals with the same network equipment information.

Step 303: obtaining the location information of the non-positioned terminals with the same network equipment information as the positioned terminals according to the location information of the positioned terminals. The non-positioned terminals with the same network equipment information as the positioned terminals and the positioned terminals are in the same LAN. Owing to the region locations of the terminals in the same LAN are concentrated, the location information of the non-positioned terminals with the same network equipment information as the positioned terminals can be determined according to the location information of the positioned terminals.

In practice, the location information of the non-positioned terminals with the same network equipment information as the positioned terminals can be obtained through processing the location information of the positioned terminals with the same network equipment information. A process of processing the location information of the positioned terminals includes an aggregation process and a denoising process. Suppose there are one hundred terminals in a LAN. Wherein, fifty terminals in the one hundred terminals are positioned terminals. The fifty positioned terminals are aggregated firstly according the location information of the fifty positioned terminals. For example, two aggregations are obtained through aggregating the fifty positioned terminals. One of the two aggregations includes thirty eight positioned terminals. The other of the two aggregations includes ten positioned terminals. Owing to the data of the remaining two positioned terminals are error, the distances between the locations of the remaining two positioned terminals of the fifty positioned terminals and the locations of the other positioned terminals of the fifty positioned terminals are larger (such as the distance is more than 10 kilometers). Therefore, the remaining two positioned terminals can be cleared away firstly. The aggregation including the thirty eight terminals is selected. Location information of a center of the selected aggregation is obtained to be used to be as location information of the other fifty non-positioned terminals in the LAN. For example, the location of the center of the selected aggregation may be a center of a geometric figure composed by the thirty eight terminals, or a location from which a distance to the thirty eight terminals is the shortest.

Figure 4:
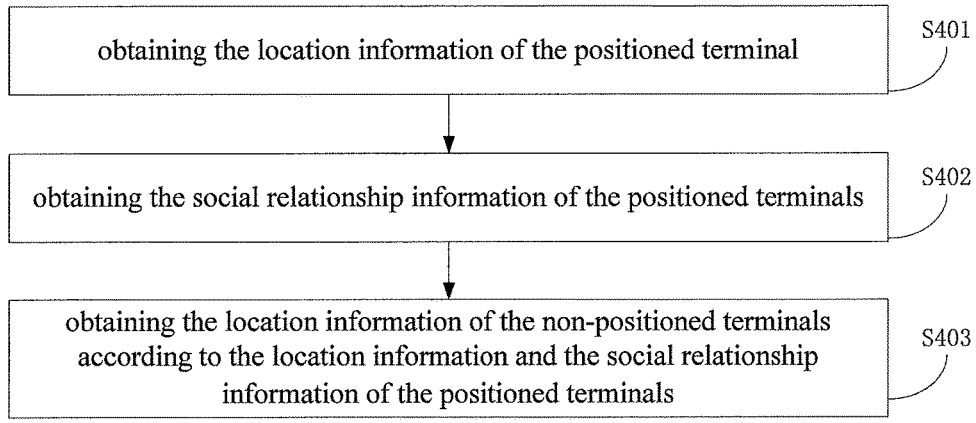
FIG. 4 is a flowchart of a yet another example of a method for positioning terminals according to various embodiments.

Referring to FIG. 4, it is a flowchart of a yet another example of a method for positioning terminals according to various embodiments. The method includes the following steps.

Step 401: obtaining the location information of the positioned terminal. The positioned terminals may be the terminals positioned through existing positioning ways based on satellites, mobile base stations or wireless fidelity (WiFi) hotspot devices. When the positioned terminals are positioned through existing positioning ways based on satellites, mobile base stations or wireless fidelity (WiFi) hotspot devices, the location information of the positioned terminals can be obtained. The positioned terminals also can be the terminals corresponding to the location information obtained by using the method of the embodiment. Preferably, the positioning time corresponding to the location information obtained this time may be recorded when the location information of the positioned terminals is obtained.

Step 402: obtaining the social relationship information of the positioned terminals. Specifically, the social relationship information may include personal relationships information, social interaction information, a similarity of personal data, and so on.

Step 403: obtaining the location information of the non-positioned terminals according to the location information and the social relationship information of the positioned terminals. The social relationship between the non-positioned terminals and the positioned terminals satisfies the predetermined condition. Specifically, that whether the social relationship between the users corresponding to the non-positioned terminals and the user corresponding to the positioned terminal satisfies the predetermined condition can be determined through the social relationship information of the positioned terminals. For example, the non-positioned terminals can be the terminals corresponding to the users that have a special social relationship with the user corresponding to the positioned terminals. The users corresponding to the non-positioned terminals may be the family, colleagues, friends of the user corresponding to the positioned terminals. When the social relationship between the users corresponding to the non-positioned terminals and the users corresponding to the positioned terminals satisfies the predetermined condition, it indicates that the users corresponding to the non-positioned terminals and the users corresponding to the positioned terminal are closer or often stay together.

For example, for a user A and a user B using the SNS service platform, which a relationship between the user A and the user B is colleagues can be determined through the personal relationship information pre-recorded on the SNS service platform. That the user A and the user B are friends can be determined through some contents recorded on the SNS service platform. The contents may include chats between the user A and the user B using on the SNS service platform or a content of the user A and the user B participating in that discussion about the same topic together using the SNS service platform. The obtained location information of the terminal used by the user A in the period of work time can be considered as the location information of the terminal used by the user B.

Further, referring to FIG. 8, the users can be divided according to the users' social relationship information to get a plurality of social relationship groups. Social relationships among members of the social relationship groups satisfy the predetermined condition (the social relationships among the users with the lines satisfy the predetermined condition). Locations of other members of the social relationship groups can be obtained according to the social relationship among the members of the social relationship groups and the behavior regularity obtained according to the location information of the positioned terminals corresponding to the users from the social relationship groups. The social relationships among the members of the social relationship groups are colleagues working in the same company. The pre-obtained behavior regularities of the two members corresponding to the positioned terminals are in xx building in the period of workday form nine o'clock to eighteen o'clock. Therefore, the location is considered as the locations of the terminals used by other members of the social relationship groups in the period of time.

Figure 5:
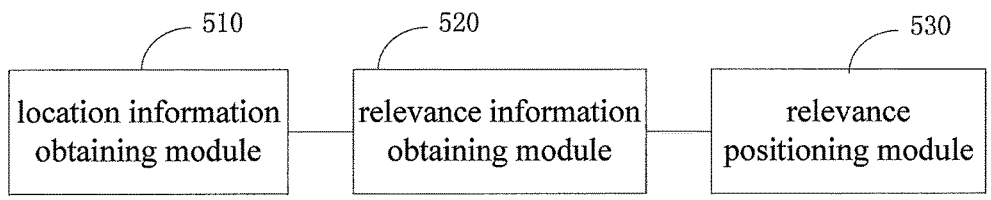
FIG. 5 is a block diagram of an example of a device for positioning terminals according to various embodiments, the device including a relevance positioning module and a multi-terminal positioning module.

Referring to FIG. 5, it is a block diagram of a device for positioning terminals according to various embodiments. The device of the embodiment may be applied to equipments supplying all kinds of LBS services or backend servers. The device includes a location information obtaining module 510, a relevance information obtaining module 520, and a relevance positioning module 530.

The location information obtaining module 510 is used to obtain location information of positioned terminals.

In practice, the positioned terminals may be the terminals positioned through existing positioning ways based on satellites, mobile base stations or wireless fidelity (WIFI) hotspot devices. When the positioned terminals are positioned through existing positioning ways based on satellites, mobile base stations or wireless fidelity (WIFI) hotspot devices, the location information of the positioned terminals can be obtained. The positioned terminals also can be the terminals corresponding to the location information obtained by using the method of the embodiment. The location information may be longitude and latitude, coordinates on the maps, graphic, word, or other means, to indicate geographic location information of the positioned terminals. Preferably, when the location information of the positioned terminal is obtained, positioning time of obtaining the position information this time may be recorded. In the embodiment, the location information of the positioned terminals and the positioning time corresponding to the location information this time may be recorded to be used to be as references of the following obtained behavior information of the positioned terminals.

The relevance information obtaining module 520 is used to obtain relevance information of the positioned terminals.

In practice, the relevance information may be the relevance information between the positioned terminals and relevance terminals. The relevance terminals are the terminals having region relevance relationships with the positioned terminals. The relevance terminals may include relevance account login terminals, first non-positioned terminals, and second non-positioned terminals. Login accounts of the relevance account login terminals are associated with login accounts of the positioned terminals. The first non-positioned terminals and the positioned terminals have the same network equipment information. Social relationships between the second non-positioned terminals and the positioned terminals satisfy a predetermined condition.

The login accounts of the relevance account login terminals and the long account of the positioned terminals may be the same. Or the login accounts of the relevance account login terminals may be associated with the login accounts of the positioned terminals in advance, and the login accounts of the relevance account login terminals and the positioned terminals are used by the same users on the different service platform, or the login accounts of the relevance account login terminals and the positioned terminals have a relationship established by associated users in the same server. For example, the users can use the same login account to login in an instant messaging tool in a mobile phone and a personal computer. The mobile phone is the relevance account login terminal of the personal computer. Another example, the mobile phone is the positioned terminal. The login account of the mobile phone is the login account of the instant messaging tool running on the mobile phone. The login account of the mobile phone has been associated with a login account of social networking services (SNS) community running on the user's computer. Therefore, the user's computer is the relevance account login terminal of the mobile phone. The relevance information obtained by the relevance information obtaining module 520 may include the login information of the relevance account login terminal. The login information includes login time of logining in the relevance account login terminal this time. The login information also may include an identifier of the relevance account login terminal, such as network card MAC.

The non-positioned terminals with the same network equipment information as the positioned terminals and the positioned terminals may be in the same local area network (LAN). The relevance information obtained by the relevance information obtaining module 520 may include the network equipment information of the positioned terminals. The network equipment information may be a unique identifier of the network management equipment used by the LAN or the public IP address. The terminals with the same network equipment information as the positioned terminals can be considered as the terminals belonging to the same LAN.

The non-positioned terminals may be the terminals used by users have a special social relationship with the user corresponding to the positioned terminal. The social relationships between the users corresponding to the positioned terminals and the users corresponding to the non-positioned terminals satisfy the predetermined condition. The users having a special social relationship with the users corresponding to the positioned terminals may be the user's family, colleagues, friends, and so on. The relevance information obtained by the relevance information obtaining module 520 includes the social relationship information of the users corresponding to the positioned terminals. In detail, the relevance information may include personal relationship information, social interaction information, similarity of personal information, and so on. That whether the social relationship between the users corresponding to the positioned terminals and users corresponding to other terminals satisfy the predetermined condition can be determined through the relevance information of the positioned terminals.

The relevance positioning module 530 is used to obtain the location information of the relevance terminals according to the location information and the relevance information of the positioned terminals. The relevance terminals may be the terminals with the same region relevance with the positioned terminals. When the relevance terminals are not mobile terminals and have no the corresponding satellite positioning modules, the current location information of the relevance terminals cannot be obtained. Or because of the network environment of the relevance terminals or settings of the relevance terminals, the current location information of the relevance terminals cannot be obtained.

Figure 6:
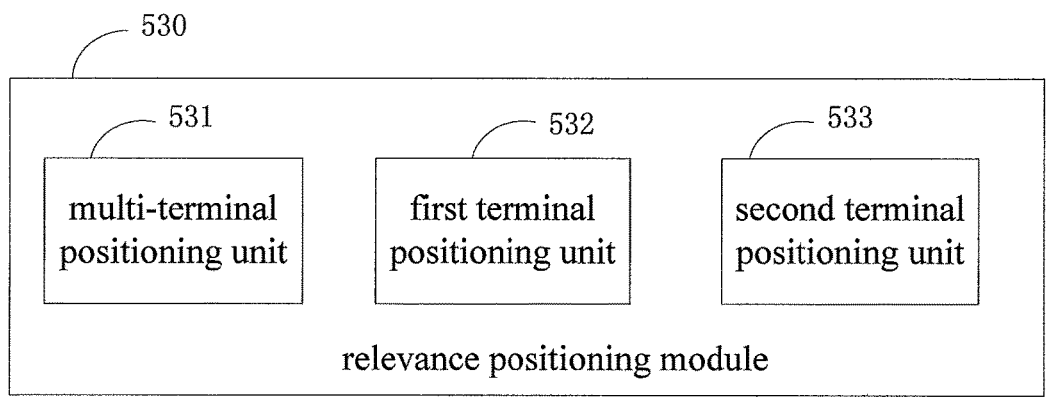
FIG. 6 is a block diagram of the relevance positioning module of FIG. 5.

Referring to FIG. 6, in the embodiment, the relevance positioning module 530 may include a multi-terminal positioning unit 531, a first terminal positioning unit 532, and a second terminal positioning unit 533.

The multi-terminal positioning unit 531 is used to obtain the location information of the positioned terminals corresponding to the relevance account login terminals according to the login information of the relevance account login terminals, and considering the obtained location information as the location information of the relevance account login terminal.

In practice, for the relevance account login terminals, the login accounts of the relevance account login terminals are associated with the login accounts of the positioned terminals (such as the same accounts or the same user's multiply accounts). Therefore, when the time of logining in the relevance account login terminals and the time of positioning the positioned terminals are closer or coincident, the multi-terminal positioning unit 531 defines the obtained location information of the positioned terminals at the time of positioning the positioned terminals as the location information of the relevance account login terminals. For example, when a time difference between the login time of the relevance account login terminal and the latest positioning time of the positioned terminal is less than a predetermined threshold (such as three seconds), the first positioning terminal 531 defines the location information obtained at the positioning time of the positioned terminal as the location information of the relevance account login terminal.

Figure 7:
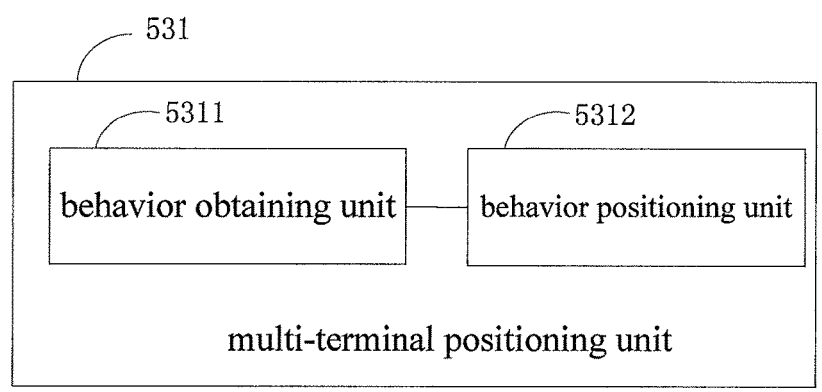
FIG. 7 is a block diagram of the multi-terminal positioning module of FIG. 5.

Referring to FIG. 7, the multi-terminal positioning unit 531 may include a behavior obtaining unit 5311 and a behavior positioning unit 5312.

The behavior obtaining unit 5311 is used to obtain behavior information of the positioned terminals according to the location information obtained in a period of time of the positioned terminals and the corresponding positioning time. The behavior information includes the constant location information of the positioned terminal and the period of time corresponding to the constant location information. The period of time may be a latest week, or a latest month, or form starting positioning services to data. The period of time also may be the time specified by the users. The behavior obtaining unit 5311 obtains the behavior information of the positioned terminals through the location information of the positioned terminals and the corresponding positioning time in the determined period of time. The behavior information indicates the behavioral regularly of the positioned terminals. For example, generally, the positioned terminal is in xx building from nine o'clock to eighteen o'clock of workdays, and in xx residential area from twenty one o'clock in the night to eight o'clock of the second day.

The behavior positioning unit 5312 is used to obtain a period of time corresponding to the login time of the relevance account login terminals in the behavior information, and obtain the constant location information corresponding to the determined period of time to be used to be as the location information of the relevance account login terminal. For example, the login time obtained by the relevance information obtaining module 520 at a certain time (or several times) of the relevance account login terminal is twenty two o'clock on Wednesday, the period of time which the login time of the relevance account login terminal belongs to is from twenty one o'clock in the night to eight o'clock of the second day. The constant location of the positioned terminals is the xx residential area in the period of time from twenty one o'clock in the night to eight o'clock of the second day. Therefore, the constant location information of the positioned terminals is used to be as the location information of the relevance account login terminal. When the login time obtained at a certain time (or several times) of another relevance account login terminal corresponding to the positioned terminals is ten o'clock on Monday, the period of time which the login time of another account login terminal corresponding to the positioned terminals belongs to is from nine o'clock to eighteen o'clock of the workdays. The constant location of the positioned terminals in the period of time from nine o'clock to eighteen o'clock of the workdays is the xx building. Therefore, the constant location information of the positioned terminals is used to be the location information of another relevance account login terminal. The different relevance account login terminals corresponding to the same positioned terminal can be distinguished through the identifiers of the obtained login information. As mentioned, the relevance account login terminals in the period of work time may be personal computers of an office. The relevance account login terminals in the period of rest time may be notebook computers of the user's home. The personal computers of the office and the notebook computers of the user's home have the corresponding identifier, such network MAC.

The first terminal positioning unit 532 is used to obtain the location information of the non-positioned terminals with the same network equipment information as the positioned terminal according to the location information of the positioned terminals. For the non-positioned terminals with the same network equipment information as the positioned terminals, the non-positioned terminals and the positioned terminals are in the same LAN. Generally, the locations of the terminals in the same LAN are concentrated. Therefore, the location information of the non-positioned terminals with the same network equipment information as the positioned terminal can be determined according to the location information of the positioned terminals. In the embodiment, the positioning information obtaining module 510 can obtain the location information of the non-positioned terminals with the same network equipment information as the positioned terminals through processing the location information of the positioned terminals with the same network equipment information. A process of processing the location information of the positioned terminals includes an aggregation process and a denoising process. Suppose there are one hundred terminals in a LAN. Wherein, fifty terminals in the one hundred terminals are positioned terminals. The second positioning unit 532 aggregates the fifty positioned terminals firstly according the location information of the fifty positioned terminals. For example, two aggregations are obtained through aggregating the fifty positioned terminals. One of the two aggregations includes thirty eight positioned terminals. The other of the two aggregations includes ten positioned terminals. Owing to the data of the remaining two positioned terminals are error, the distances between the locations of the remaining two positioned terminals of the fifty positioned terminals and the locations of the other positioned terminals of the fifty positioned terminals are larger (such as the distance is more than 10 kilometers). Therefore, the remaining two positioned terminals can be cleared away firstly. The first terminal positioning unit 532 selects the aggregation including the thirty eight terminals. Location information of a center of the selected aggregation is obtained to be used to be as location information of the other fifty non-positioned terminals in the LAN. For example, the location of the center of the selected aggregation may be a center of a geometric figure composed by the thirty eight terminals, or a location from which a distance to the thirty eight terminals is the shortest. The first terminal positioning unit 532 defines the location information of the center of the selected aggregation as the location information of the other fifty non-positioned terminals in the LAN.

The second terminal positioning unit 533 is used to obtain the location information of the non-positioned terminals according to the location information and the social relationship information of the positioned terminals. The social relationship between the non-positioned terminals and the positioned terminals satisfies the predetermined condition. In practice, the second terminal positioning terminal 533 can determine whether the social relationship between the users corresponding to the non-positioned terminals and the user corresponding to the positioned terminal satisfies the predetermined condition through the social relationship information of the positioned terminals. For example, the non-positioned terminals can be the terminals corresponding to the users that have a special social relationship with the user corresponding to the positioned terminals. The users corresponding to the non-positioned terminals may be the family, colleagues, friends of the user corresponding to the positioned terminals. When the social relationship between the users corresponding to the non-positioned terminals and the users corresponding to the positioned terminals satisfies the predetermined condition, it indicates that the users corresponding to the non-positioned terminals and the users corresponding to the positioned terminal are closer or often stay together. Therefore, the second terminal positioning unit 533 can obtain the location information of the non-positioned terminals according to the location information of the positioned terminals.

For example, for a user A and a user B using the SNS service platform, which a relationship between the user A and the user B is colleagues can be determined through the personal relationship information pre-recorded on the SNS service platform. That the user A and the user B are friends can be determined through some contents recorded on the SNS service platform. The contents may include chats between the user A and the user B using on the SNS service platform or a content of the user A and the user B participating in that discussion about the same topic together using the SNS service platform. The second terminal positioning unit 533 considers the obtained location information of the terminal used by the user A in the period of work time as the location information of the terminal used by the user B. Further, referring to FIG. 8, the users can be divided according to the users' social relationship information to get a plurality of social relationship groups. Social relationships among members of the social relationship groups satisfy the predetermined condition (the social relationships among the users with the lines satisfy the predetermined condition). Locations of other members of the social relationship groups can be obtained according to the social relationship among the members of the social relationship groups and the behavior regularity obtained according to the location information of the positioned terminals corresponding to the users from the social relationship groups. The social relationships among the members of the social relationship groups are colleagues working in the same company. The pre-obtained behavior regularities of the two members corresponding to the positioned terminals are in xx building in the period of workday form nine o'clock to eighteen o'clock. Therefore, the location is considered as the locations of the terminals used by other members of the social relationship groups in the period of time.

In the embodiment, it is can be realized that obtaining the location information of the non-positioned terminals with the region relevance with the positioned terminals through obtaining the location information of the positioned terminals and the relevance information. Therefore, the coverage of the LBS service based on the users' location information is improved.

A person having ordinary skills in the art can realize that part or whole of the processes in the methods according to the above embodiments may be implemented by a computer program instructing relevant hardware. The program may be stored in a computer readable storage medium. When executed, the program may execute processes in the above-mentioned embodiments of methods. The storage medium may be a magnetic disk, an optical disk, a Read-Only Memory (ROM), a Random Access Memory (RAM), et al.

The above descriptions are some exemplary embodiments of the invention, and should not be regarded as limitation to the scope of related claims. A person having ordinary skills in a relevant technical field will be able to make improvements and modifications within the spirit of the principle of the invention. The improvements and modifications should also be incorporated in the scope of the claims attached below.

What is claimed is:

1. A method for positioning terminals, comprising:
   obtaining location information of at least one positioned terminal;
   determining at least one relevance terminal relating to the at least one positioned terminal, wherein the at least one relevance terminal comprises one of the following terminals: the terminal having a first login account for logging in which is related to a second login account for logging in the at least one positioned terminal, the terminal being in a same local area network as the at least one positioned terminal, and the terminal having a social relationship with the at least one positioned terminal that satisfies a predetermined condition; and
   assigning inferred location information to the at least one relevance terminal according to the location information of the at least one positioned terminal;
   wherein the obtaining location information of at least one positioned terminal comprises:
   obtaining the location information of the at least one positioned terminal and positioning time corresponding to the location information;
   wherein when the at least one relevance terminal is the terminal having the first login account which is related to the second login account for the at least one positioned terminal, the assigning the inferred location information to the at least one relevance terminal further comprises:
   determining the location information of the at least one positioned terminal which is obtained according to a login time of logging in the at least one relevance terminal using the first login account as the inferred location information of the at least one relevance terminal.

2. The method according to claim 1, wherein determining the location information of the at least one positioned terminal which is obtained according to the login time of logging in the at least one relevance terminal using the first login account as the location information of the at least one relevance terminal comprises:
   obtaining behavior information of the at least one positioned terminal according to the location information obtained in a period of time of the at least one positioned terminal and the corresponding positioning time, wherein the behavior information comprises constant location information of the at least one positioned terminal and the period of time corresponding to the constant location information; and
   obtaining a period of time corresponding to the login time of the at least one relevance terminal in the behavior information, obtaining constant location information corresponding to the determined period of time, and considering the constant location as the inferred location information of the at least one relevance terminal.

3. The method according to claim 1, wherein when each of the relevance terminals is the terminal being in the same local area network as the at least one positioned terminal, the assigning the inferred location information to the at least one relevance terminal further comprises:
   determining the inferred location information of all of the relevance terminals being in the same local area network as the at least one positioned terminal according to the location information of all of the at least one positioned terminal.

4. The method according to claim 3, wherein assigning the inferred location information to the at least one relevance terminal further comprises:
   aggregating the at least one positioned terminal according to the location information of the at least one positioned terminal to obtain at least one aggregated group of positioned terminals;
   selecting one aggregated group containing a greatest number of positioned terminals; and
   determining the location information of all of the relevance terminals in the same local area network as the at least one positioned terminal according to location information of the selected aggregated group of positioned terminals.

5. The method according to claim 1, wherein when the at least one relevance terminal is the terminal having the social relationship with the at least one positioned terminal that satisfies a predetermined condition, the assigning the inferred location information to the at least one relevance terminal further comprises:
   determining the location information of the at least one positioned terminal as the inferred location information of the at least one relevance terminal.

6. The method according to claim 1, wherein the inferred location information of the at least one relevance terminal is assigned to be the same as the location information of the at least one positioned terminal.

7. The method according to claim 1, wherein before the inferred location information is assigned, a direct position data of the at least one relevance terminal is not available.

8. The method according to claim 1, wherein:
   obtaining the location information of at least one positioned terminal further comprises: obtaining the location information of the at least one positioned terminal and positioning time corresponding to the location information; and
   when the at least one relevance terminal is the terminal login account related to the second login account for logging in the at least one positioned terminal, the inferred location information of the at least one relevance terminal is assigned to be the same as the location information of the at least one positioned terminal having a corresponding positioning time that satisfies a preset requirement, the preset requirement being that a time difference between the corresponding positioning time and the login time of logging in the at least one relevance terminal using the first login account is less than a predetermined threshold.

9. A device for positioning terminals, comprising:
   a memory storing a plurality of computer-readable program codes; and
   a processor configured to execute the plurality of computer-readable program codes for:
   obtaining location information of at least one positioned terminal;

determining at least one relevance terminal relating to the at least one positioned terminal, wherein the at least one relevance terminal comprises one of the following terminals: the terminal having a first login account for logging in which is related to a second login account for logging in the at least one positioned terminal, the terminal being in a same local area network as the at least one positioned terminal, and the terminal having a social relationship with the at least one positioned terminal that satisfies a predetermined condition; and assigning inferred location information to the at least one relevance terminal according to the location information of the at least one positioned terminal;

wherein the obtaining location information of at least one positioned terminal comprises:

obtaining the location information of the at least one positioned terminal and positioning time corresponding to the location information;

wherein when the at least one relevance terminal is the terminal having the first login account which is related to the second login account for the at least one positioned terminal, the assigning the inferred location information to the at least one relevance terminal further comprises:

determining the location information of the at least one positioned terminal which is obtained according to a login time of logging in the at least one relevance terminal using the first login account as the inferred location information of the at least one relevance terminal.

10. The device according to claim 9, wherein determining the location information of the at least one positioned terminal which is obtained according to the login time of logging in the at least one relevance terminal using the first login account as the location information of the at least one relevance terminal comprises:

obtaining behavior information of the at least one positioned terminal according to the location information obtained in a period of time of the at least one positioned terminal and the corresponding positioning time, wherein the behavior information comprises constant location information of the positioned terminal and the period of time corresponding to the constant location information; and obtaining a period of time corresponding to the login time of the at least one relevance terminal in the behavior information, obtaining constant location information corresponding to the determined period of time, and considering the constant location as the inferred location information of the at least one relevance terminal.

11. The device according to claim 9, wherein when each of the relevance terminals is the terminal being in the same local area network as the at least one positioned terminal, the assigning the inferred location information to the at least one relevance terminal further comprises:

determining the inferred location information of all of the relevance terminals being in the same local area network as the at least one positioned terminal according to the location information of all of the at least one positioned terminal.

12. The device according to claim 9, wherein when the at least one relevance terminal is the terminal having the social relationship with the at least one positioned terminal that satisfies a predetermined condition, the assigning the inferred location information to the at least one relevance terminal further comprises:

determining the location information of the at least one positioned terminal as the inferred location information of the at least one relevance terminal.

13. A non-transitory computer readable storage medium storing computer-executable instructions that, when executed by at least one processor, perform a method comprising steps of:

obtaining location information of at least one positioned terminal;

determining at least one relevance terminal relating to the at least one positioned terminal, wherein the at least one relevance terminal comprises one of the following terminals: the terminal having a first login account for logging in which is related to a second login account for logging in the at least one positioned terminal, the terminal being in a same local area network as the at least one positioned terminal, and the terminal having a social relationship with the at least one positioned terminal that satisfies a predetermined condition; and assigning inferred location information to the at least one relevance terminal according to the location information of the at least one positioned terminal, wherein the obtaining location information of at least one positioned terminal comprises:

obtaining the location information of the at least one positioned terminal and positioning time corresponding to the location information;

wherein when the at least one relevance terminal is the terminal having the first login account which is related to the second login account for the at least one positioned terminal, the assigning the inferred location information to the at least one relevance terminal further comprises:

determining the location information of the at least one positioned terminal which is obtained according to a login time of logging in the at least one relevance terminal using the first login account as the inferred location information of the at least one relevance terminal.

14. The non-transitory computer readable storage medium of claim 13, wherein determining the location information of the at least one positioned terminal which is obtained according to the login time of logging in the at least one relevance terminal using the first login account as the location information of the at least one relevance terminal comprises:

obtaining behavior information of the at least one positioned terminal according to the location information obtained in a period of time of the at least one positioned terminal and the corresponding positioning time, wherein the behavior information comprises constant location information of the positioned terminal and the period of time corresponding to the constant location information; and obtaining a period of time corresponding to the login time of the at least one relevance account login terminal in the behavior information, obtaining constant location information corresponding to the determined period of time, and considering the constant location as the inferred location information of the at least one relevance account login terminal.

15. The non-transitory computer readable storage medium of claim 13, wherein when each of the relevance terminals is the terminal being in the same local area network as the at least one positioned terminal, the assigning the inferred location information to the at least one relevance terminal further comprises:

determining the inferred location information of all of the relevance terminals being in the same local area network as the at least one positioned terminal according to the location information of all of the at least one positioned terminal.

16. The non-transitory computer readable storage medium of claim 13, wherein when the at least one relevance terminal is the terminal having the social relationship with the at least one positioned terminal that satisfies a predetermined condition, the assigning the inferred location information to the at least one relevance terminal further comprises:

determining the location information of the at least one positioned terminal as the inferred location information of the at least one relevance terminal.

* * * * *